(12) United States Patent
Janeke

(10) Patent No.: US 11,548,664 B1
(45) Date of Patent: Jan. 10, 2023

(54) SYSTEM, APPARATUS, AND METHODS FOR A NOSECONE AND PROPULSIVE NOZZLE

(71) Applicant: Charl E. Janeke, Los Angeles, CA (US)

(72) Inventor: Charl E. Janeke, Los Angeles, CA (US)

( * ) Notice: Subject to any disclaimer, the term of this patent is extended or adjusted under 35 U.S.C. 154(b) by 372 days.

(21) Appl. No.: 17/027,166

(22) Filed: Sep. 21, 2020

Related U.S. Application Data

(63) Continuation of application No. 16/405,910, filed on May 7, 2019, now Pat. No. 10,780,999, which is a continuation of application No. 15/414,480, filed on Jan. 24, 2017, now Pat. No. 10,279,932, which is a continuation-in-part of application No. 15/083,128, filed on Mar. 28, 2016, now Pat. No. 9,550,586, which is a continuation-in-part of application No. 14/564,024, filed on Dec. 8, 2014, now Pat. No. 9,297,625, which is a continuation-in-part of application No. 14/313,976, filed on Jun. 24, 2014, now abandoned.

(60) Provisional application No. 61/838,754, filed on Jun. 24, 2013.

(51) Int. Cl.
| | |
|---|---|
| *B64G 1/62* | (2006.01) |
| *F42B 15/34* | (2006.01) |
| *F42B 10/38* | (2006.01) |
| *F25D 3/10* | (2006.01) |
| *F42B 12/02* | (2006.01) |
| *F42B 10/34* | (2006.01) |
| *B64G 1/66* | (2006.01) |
| *F42B 10/46* | (2006.01) |

(52) U.S. Cl.
CPC .............. *B64G 1/62* (2013.01); *B64G 1/66* (2013.01); *F25D 3/10* (2013.01); *F42B 10/34* (2013.01); *F42B 10/38* (2013.01); *F42B 10/46* (2013.01); *F42B 12/02* (2013.01); *F42B 15/34* (2013.01)

(58) Field of Classification Search
CPC ... B64G 1/62; F25D 3/10; F42B 10/38; F42B 15/34
USPC ....................................................... 244/130
See application file for complete search history.

(56) References Cited

U.S. PATENT DOCUMENTS

| | | | | |
|---|---|---|---|---|
| 3,745,832 A * | 7/1973 | Johnson | ................ | G01M 99/00 73/1.87 |
| 4,778,130 A * | 10/1988 | Kim | ...................... | B64D 27/24 244/57 |
| 6,247,671 B1 * | 6/2001 | Saeks | .................... | B64C 23/005 244/130 |
| 8,657,237 B2 * | 2/2014 | Schulein | ................ | B64C 23/04 244/130 |
| 9,550,586 B2 * | 1/2017 | Janeke | ..................... | B64G 1/62 |
| 2005/0000383 A1 * | 1/2005 | Facciano | ................ | F42B 10/46 102/377 |

(Continued)

FOREIGN PATENT DOCUMENTS

WO    WO-2014120328 A2 *    8/2014    ............. B64C 21/10

*Primary Examiner* — Christopher P Ellis
(74) *Attorney, Agent, or Firm* — J. Curtis Edmondson; Law Offices of J. Curtis Edmondson

(57) ABSTRACT

A nosecone apparatus for hypersonic aircraft, rocket or missiles using a method for the mitigation of the created the shock front of a rocket or aerospace plane flying at hypersonic speeds by using nosecone splines to create both centripetal and isentropic airflows in conjunction with regeneratively cooling the nosecone structure.

1 Claim, 10 Drawing Sheets

(56) References Cited

U.S. PATENT DOCUMENTS

| | | | | |
|---|---|---|---|---|
| 2013/0213481 A1* | 8/2013 | Drayna | .................. | G06F 30/15 |
| | | | | 137/15.1 |
| 2015/0336659 A1* | 11/2015 | Zhong | ...................... | F15D 1/08 |
| | | | | 244/130 |
| 2015/0375125 A1* | 12/2015 | Lurie | ...................... | G01M 9/04 |
| | | | | 472/49 |
| 2016/0318634 A1* | 11/2016 | Janeke | .................... | F42B 10/46 |
| 2017/0057614 A1* | 3/2017 | Janeke | .................... | B64C 30/00 |
| 2017/0137123 A1* | 5/2017 | Janeke | .................... | B64C 39/08 |

* cited by examiner

SYSTEM, APPARATUS, AND METHODS FOR A NOSECONE AND PROPULSIVE NOZZLE

CROSS REFERENCE TO RELATED APPLICATIONS

The present application is continuation of U.S. patent application Ser. No. 15/414,480 filed on Jan. 24, 2017, entitled as "System, Apparatus and Methods for a Nosecone and a Propulsive Nozzle of an airspace plane", and claims benefit of U.S. patent application Ser. No. 15/083,128 filed on Mar. 28, 2016, entitled as "Apparatus and Methods for a Hypersonic Stochastic Switch", U.S. Utility patent application Ser. No. 14/564,024, filed on Aug. 12, 2014 and entitled "Apparatus and Methods for Hypersonic Nosecone", U.S. Utility patent application Ser. No. 14/313,976, filed on Jun. 24, 2014 and entitled "Thermally Conductive Hypersonic Nosecones" and U.S. Provisional Patent Application No. 61/838,754, filed on Jun. 24, 2013 and entitled "Hypersonic Vortex Tube", and claims the benefit of U.S. patent application Ser. No. 16/405,910 filed on May 7, 2019 and entitled "System, Apparatus and Methods for a Nosecone and a Propulsive Nozzle" the contents of which is herein incorporated by reference in its entirety.

BACKGROUND

This application describes the systems, apparatus, and methods for the reduction of drag in a spacecraft or missiles. The reduction of drag in spacecraft and missiles is desired as atmospheric friction will cause heat that can then cause a nosecone to fail. Clearly ways to reduce nosecone friction would benefit high speed missiles, allowing them to travel at higher speeds, and spacecraft, during the period of atmospheric reentry.

Also described are the details and means to transform a hypersonic stochastic vortex flux Z-plane singularity back into isentropic Y-plane mode by means of micro/planetary splines that reset the hypersonic stochastic vortex flux back into a supersonic isentropic front by means of contra rotating micro or planetary splines.

SUMMARY

The inventive subject matter is about a thermally reactive nosecone mounted on a projectile for achieving hypersonic transport comprising: an incipient shockwave, the incipient shockwave being transformed into an isentropic flux via a stochastic switch. A core component of the thermally reactive nosecone is a stochastic switch or a singularity, which is the consequence of isothermal compression and/or hypersonic liquefaction and/or regenerative cooling and/or Joule-Thomson throttling and complex cryogenic Carnot refrigeration triggered via sudden expansion and/or a porous plug integrated into the discharge end of the thermally reactive nosecone whereby a linear continuum of the incipient shockwave is transformed into a gyrating perfectly random stochastic vortex/stagnation flux. In order to transform the stochastic vortex flux back into isentropic streamlines grooved isentropic splines in the inside the discharge nozzle and/or peripheral of the nosecone of the nozzle of the thermally reactive nosecone has been proposed in lieu of the porous plug triggering Joule-Thomson throttling and complex Carnot refrigeration simultaneously. In addition to Joule-Thomson throttling and complex Carnot refrigeration an extrinsic cryogenic resource may be applied to pre/sub cool the thermally reactive nosecone to supercharge the refrigeration power of the shockwave piercing stochastic switch. Liquid nitrogen and/or a liquid cryogenic propellant may be applied as the extrinsic cryogenic resource to supercharge the switching power of the shockwave thermally reactive shockwave piercing nosecone mounted on a projectile for achieving hypersonic transport. The thermally reactive nosecone may additionally be optimized for throttling and triggering complex Carnot refrigeration liquefaction of atmospheric oxygen to drive a rocket propulsion engine of a hypersonic transport.

In another embodiment of the invention the thermally reactive nosecone may be configured with an independent/freestanding isentropic hypersonic expansion nozzle to drive the thermally reactive nosecone as a cryogenic refrigeration apparatus wherein the isentropic hypersonic expansion nozzle of the thermally reactive nosecone is optimized to distill liquid helium. Liquid helium hydrogen in the range of 1-5% of helium may additionally be introduced into the isentropic expansion nozzle to boost the liquefaction capacity of liquid helium. The thermally reactive nosecone may be additionally configured as a micro personal and/or enterprise scaled freestanding thermally reactive nosecone to distill liquid helium directly distilled out of compressed helium by means of the addition of isentropic splines within an hypersonic expansion nozzle in addition to tanked liquid nitrogen to (1) precool and (2) refrigerate the expanded helium proximal to the saturation curve of helium at absolute zero.

In another embodiment the thermally reactive nosecone is coupled within the confinements of rocket missile and/or aerospace plane with a centripetal thrust augmentation nozzle whereby (1) the centripetal thrust augmentation nozzle is equipped with grooved isentropic splines that transform/switch the stochastic vortex flux back into isentropic streamlines and (2) whereby the grooved isentropic splines centripetal thrust augmentation nozzle is equipped with enumerated supersonic ram detonation propulsive means in addition to grooved isentropic splines in isolation.

The inventive subject matter also comprises a system, apparatus and methods for a reduction of drag in a missile using a vortex tube as well as augmenting the thrust of a centripetal nozzle system with micro planetary splines.

In an embodiment is illustrated a method for reducing drag at hypersonic speed that includes the steps of mounting a liquefaction nosecone on the forward portion of a projectile; where the projectile is either a missile or spacecraft.

In another embodiment is described a method for reducing drag at hypersonic speed also having the steps of drawing an atmosphere external to the liquefaction nose cone an intake aperture or a discharge shaft.

In yet another embodiment is presented the details of a supersonic isentropic splines switching the stochastic hypersonic flux from the Z-plane back into the Y-plane to (1) maximize regenerative cooling of the shockwave piercing nosecone and (2) maximizing propulsive thrust augmentation of the stochastic or inversed centripetal supersonic ram detonation nozzle system.

This specification is not limited to a single embodiment, rather the methods and systems presented should be construed broadly and further incorporate the material presented in the drawings.

DETAILED DESCRIPTION

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

Figure 1A:
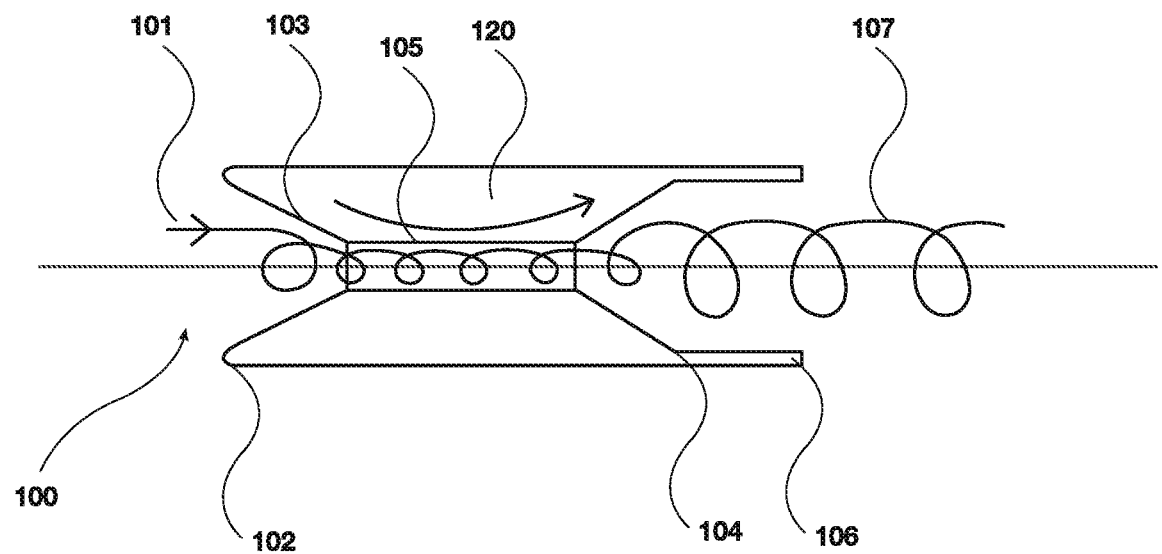
FIGS. 1A and 1B illustrates a hypersonic airflow system according to an embodiment.
Figure 1B:
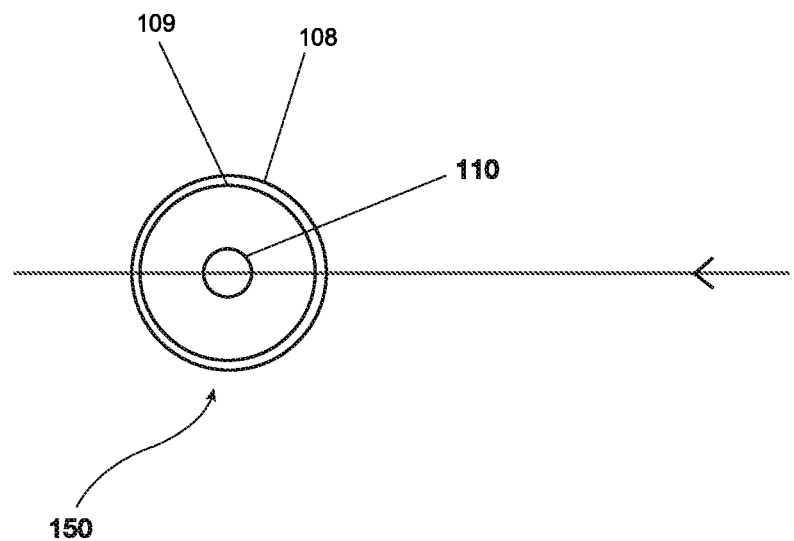

FIG. 1A depicts a first hypersonic airflow system 100, a streamline airflow 101 enters a supersonic nosecone intake 102 with a first funneled surface 103 of an airspace plane body 120. The body 120 further includes a shaft 105 connecting the nosecone intake 102 to an expansion nozzle 106 via a second funneled surface 104. The streamline airflow upon traversing through the shaft 105 and entering the expansion nozzle 106 gets transformed to a vortex flux 107, while exiting out through the expansion nozzle 106. The second funneled surface 104 is cooled and/or refrigerated to a cryogenic zone by a Joule-Thompson throttling process of the vortex flux 107. FIG. 1B illustrates a cross-sectional view 150 of an expansion nozzle of the system 100, illustrates a inner diameter 108 and an outer diameter 109 of the expansion nozzle 106 and a shaft diameter 110.

Figure 2A:
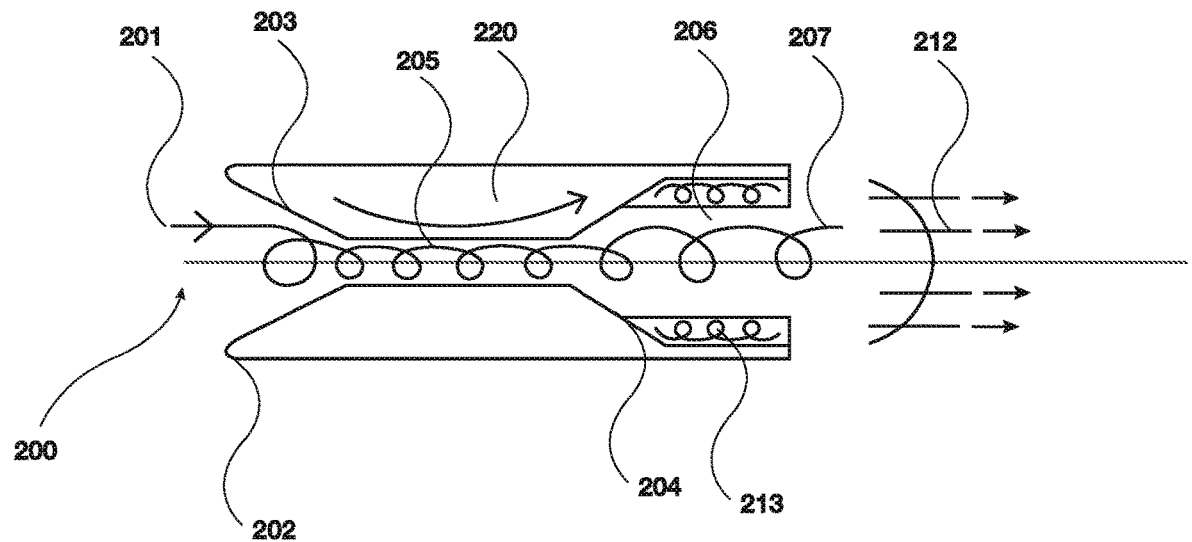
FIGS. 2A and 2B illustrates a hypersonic airflow system for a hypersonic nose cone with annular splines.
Figure 2B:
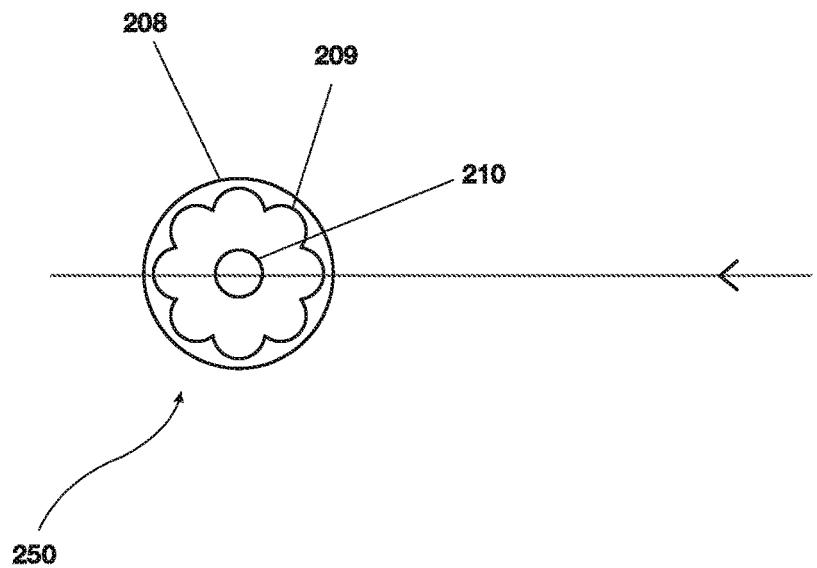

FIG. 2A depicts a second hypersonic airflow system 200, a streamline airflow 201 enters a supersonic nosecone intake 202 with a first funneled surface 203 of an airspace plane body 220. The body 220 further includes a shaft 205 connecting the nosecone intake 202 to an expansion nozzle 206 via a second funneled surface 204. The streamline airflow 201 upon traversing through the shaft 205 and entering the expansion nozzle 206 gets transformed to a vortex flux 207, while exiting out through the expansion nozzle 206. The second funneled surface 204 is cooled and/or refrigerated to a cryogenic zone by a Joule-Thompson throttling process of the vortex flux 207. Upon exiting the splined nozzle aperture 206 the vortex flux 207 is transformed into a numerosity of contrarotating micro vortices 213 that create an isentropically transformed propulsive supersonic airstream 212. FIG. 2B illustrates a cross-sectional view 250 from the expansion nozzle 206 of the system 200. The system 200 an outer diameter 208 of the expansion nozzle 206, a splined structure 209 of inner wall of expansion nozzle 206 and a shaft diameter 210.

Figure 3A:
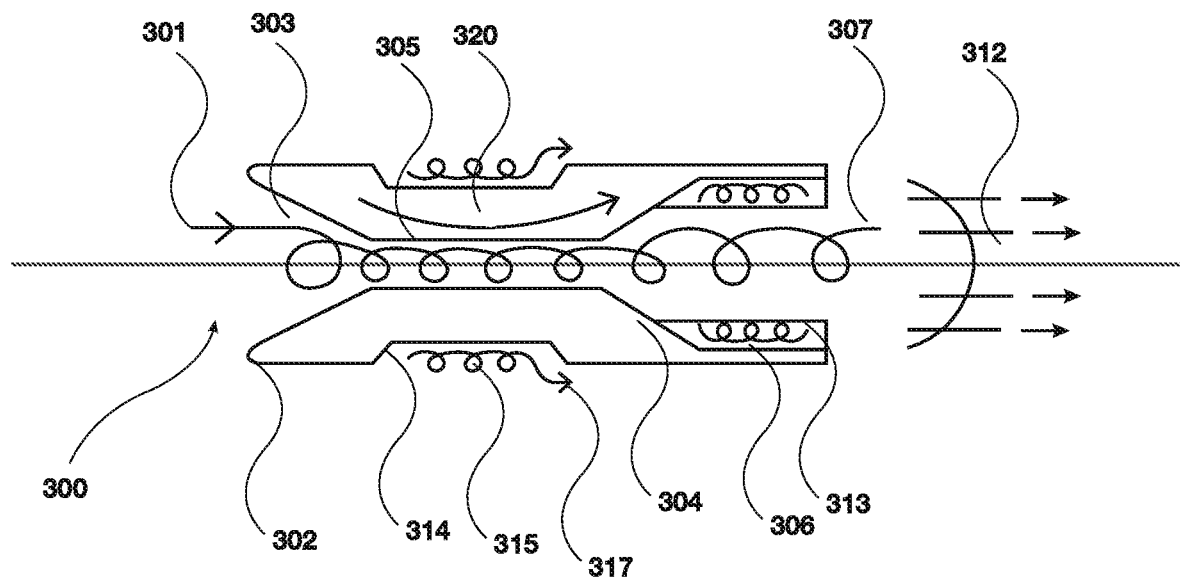
FIGS. 3A and 3B illustrates a hypersonic airflow system for a hypersonic nose cone with both annular and peripheral splines.
Figure 3B:
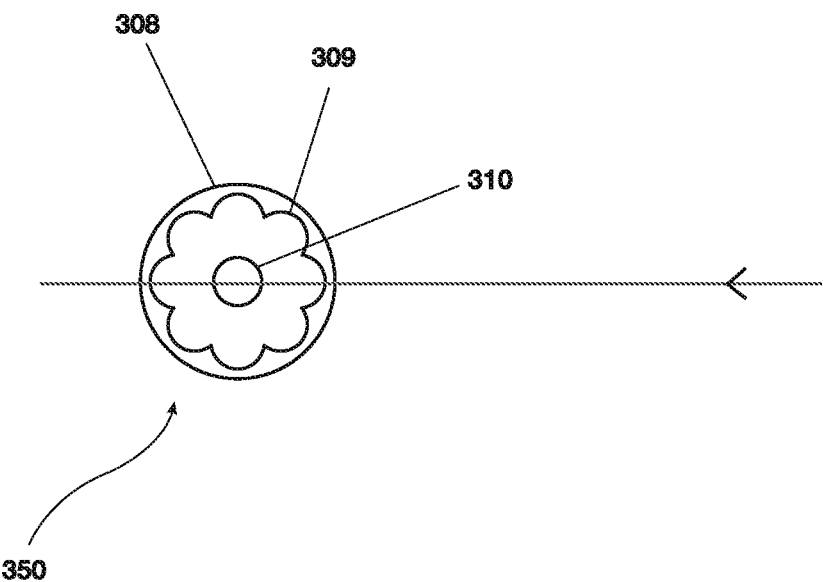

FIG. 3 illustrates a hypersonic airflow system 300. A hypersonic streamline airflow 301 enters a funneled supersonic nosecone intake 302 of an airspace plane body 320. The hypersonic streamline airflow 301 is transformed into a hypersonic stochastic vortex flux 307 when the hypersonic streamline airflow 301 contacts the regenerative chilled funneled surface 303 operating in the cryogenic zone. The regeneratively chilled funneled surface 303 is regeneratively chilled via Joule-Thomson throttling due to (1) sudden expansion 304 of the shaft 305 and (2) the splined nozzle apertures 306 whereby the primary vortex 307 is converted into a numerosity of contrarotating micro spline vortices 313. The contrarotating micro spline vortices 313 generate isentropical transformed propulsive supersonic streamline airflow 312. Likewise, the peripheral splines 314 transform the peripheral vortex 315 into a numerosity of micro spline vortices 317. As shown in FIG. 3B, that is a cross-sectional view 350 of FIG. 3A, the outer diameter 308 of the expansion nozzle 306, a splined structure 309 of inner wall of expansion nozzle 306 and a shaft diameter 310.

Figure 4A:
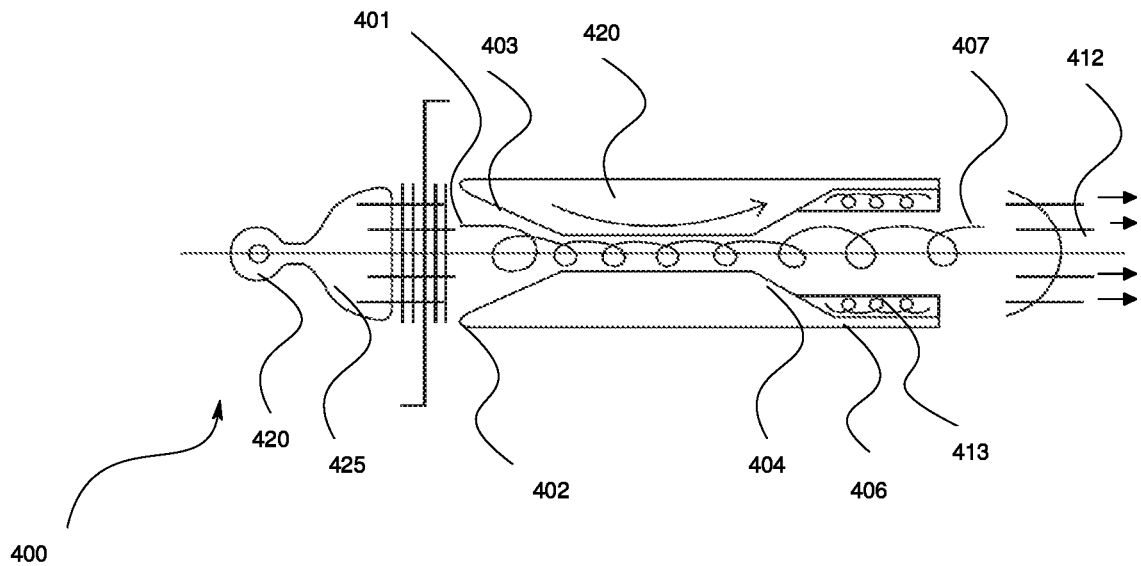
FIGS. 4A and 4B illustrates a hypersonic airflow system for a hypersonic nose cone driven by a high pressure supersonic/isentropic expansion nozzle.
Figure 4B:
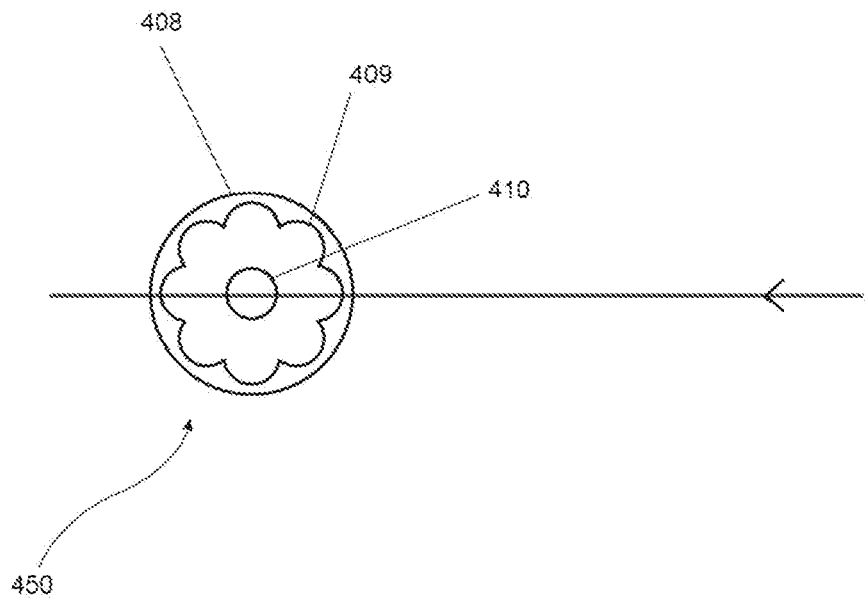

FIG. 4 illustrates a hypersonic airflow system 400. The hypersonic airflow system 400 has a hypersonic streamline 401 that is driven by a high pressure hypersonic-isentropic expansion nozzle system 420/425 that enters the funneled supersonic nosecone intake 402 of an airspace plane body 420. The hypersonic streamline 401 is transformed into a hypersonic stochastic vortex flux 407 when it contacts the regenerative chilled funneled surface 403 that operates in the cryogenic zone. The chilled funneled surface 403 is regeneratively chilled and/or refrigerated using Joule-Thomson refrigeration due to the sudden expansion 404. The hypersonic stochastic vortex flux 407 exits via the internally splined nozzle aperture 406 whereby the primary vortex 407 is being transformed into a numerocity of contrarotating micro spline vortices 413 that generates the isentropical transformed supersonic streamline 412. FIG. 4B is a cross-sectional view 450 of expansion nozzle 406. The outer diameter 408 of the expansion nozzle 406 has a splined structure 409 on the inner wall of expansion nozzle 406 and a shaft diameter 410.

Figure 5A:
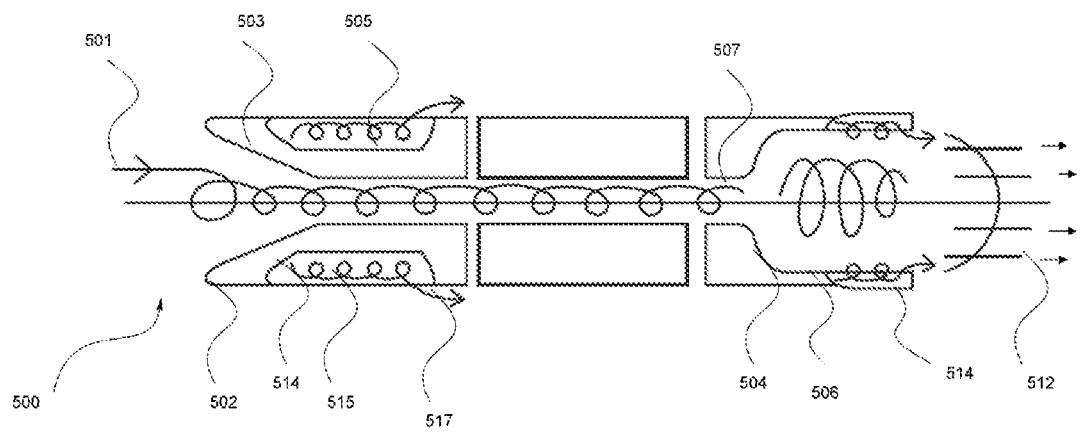
FIGS. 5A and 5B illustrates a hypersonic airflow system for a hybrid aerospace plane.
Figure 5B:
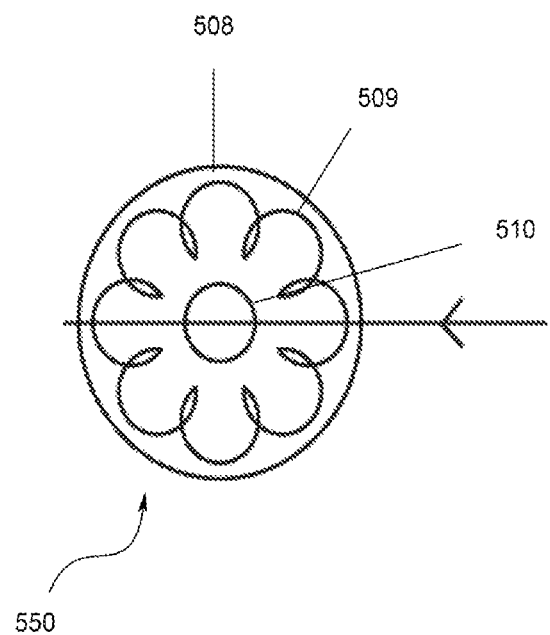

FIG. 5 illustrates a hypersonic airflow system 500. The hypersonic airflow system 500 is located within the hybrid aerospace plane with stochastic regenerative hypersonic nosecone stochastic switch in conjunction with an elemental splined centripetal thrust augmentation nozzle isentropic switch. A hypersonic streamline 501 enters the funneled supersonic nosecone intake 502. The hypersonic streamline 501 is transformed into a stochastic vortex flux 507 when the hypersonic streamline 501 contacts the regenerative chilled funneled surface 503. The regenerative chilled funneled surface 503 operates in the cryogenic zone using a Joule-Thomson refrigeration. The Joule-Thomson refrigeration is due to the expansion 504 of the shaft 505 that is proximate to the nozzle 506. The vortex flux 507 is transformed into a numerosity of contrarotating micro spline vortices 513. The contrarotating micro spline vortices 513 generate the isentropical transformed propulsive supersonic streamline airflow 512. Likewise, the peripheral splines 514 transforms the peripheral vortex 515 into a numerosity of micro spline vortices 517. FIG. 5B depicts a cross-sectional view 550 of FIG. 5A. The expansion nozzle 506 has an outer diameter 508 of the expansion nozzle 506, a splined structure 509 of inner wall of expansion nozzle 506 and a shaft diameter 510.

Figure 6A:
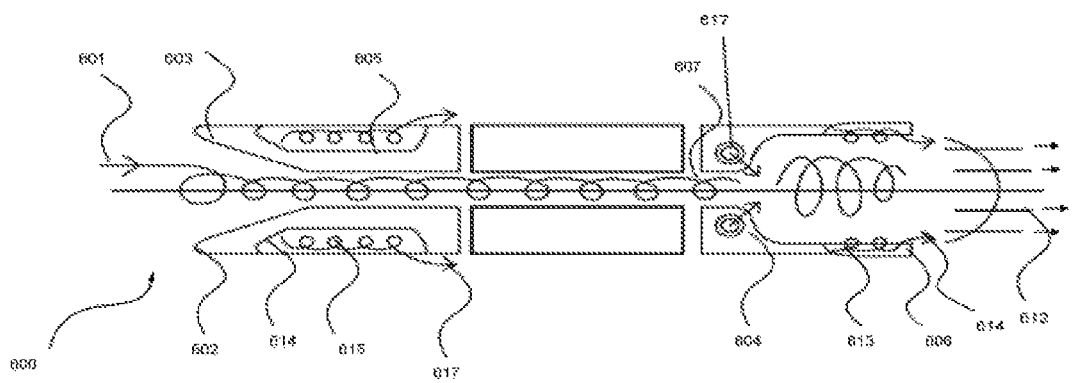
FIGS. 6A and 6B illustrates a hypersonic airflow system for a hybrid aerospace plane.

An alternate configuration is shown in FIG. 6. A system 600 has a hybrid aerospace plane with stochastic regenerative hypersonic nosecone stochastic switch in combination with an array of centripetal supersonic-detonation hypersonic constellation propellant injectors in conjunction with splined annular exit isentropic switch. A hypersonic streamline airflow 601 enters the funneled supersonic nosecone intake 602. The hypersonic streamline airflow 601 is then transformed into a stochastic vortex flux 607 when the hypersonic streamline airflow 601 contacts with the regenerative chilled funneled surface 603. The regenerative chilled funneled surface 603 operates in the cryogenic zone using Joule-Thomson refrigeration. The Joule-Thomson refrigeration is caused by the sudden expansion 604 of the shaft 605 close to the nozzle 606. The funneled vortex flux 607 is transformed into a numerosity of contrarotating micro spline vortices 613 driven by an array of hypersonic constellation micro propellant injectors 617 that generates the isentropical transformed propulsive supersonic front 612. Likewise, the peripheral splines 614 transforms the peripheral vortex 615 into a numerocity of micro spline vortices 617.

Figure 6B:
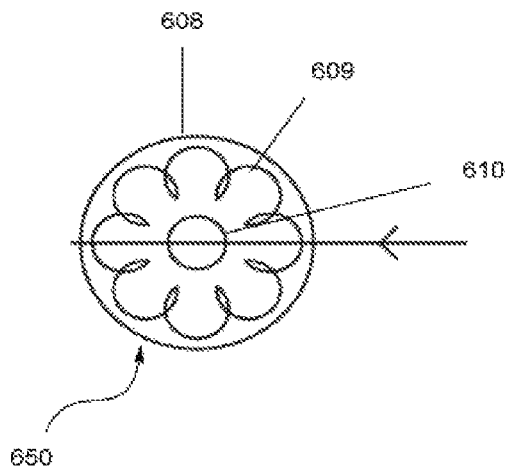

Referring to FIG. 6B, which illustrates a cross-sectional view 650, illustrates an outer diameter 608 of the expansion nozzle 606, a splined structure 609 of inner wall of expansion nozzle 606 and a shaft diameter 610.

In an embodiment, FIG. 7 illustrates a system 700, which depicts a stochastic regenerative hypersonic nose cone 705 whereby the hypersonic streamline 701 is transformed into a stochastic vortex flux at contact with the regenerative chilled funneled surface 703 in the cryogenic zone which is regeneratively chilled via Joule-Thomson throttling/refrigeration. The peripheral splines 714 transforms the peripheral vortex 715 into a numerocity of micro spline vortices 715.

Figure 7A:
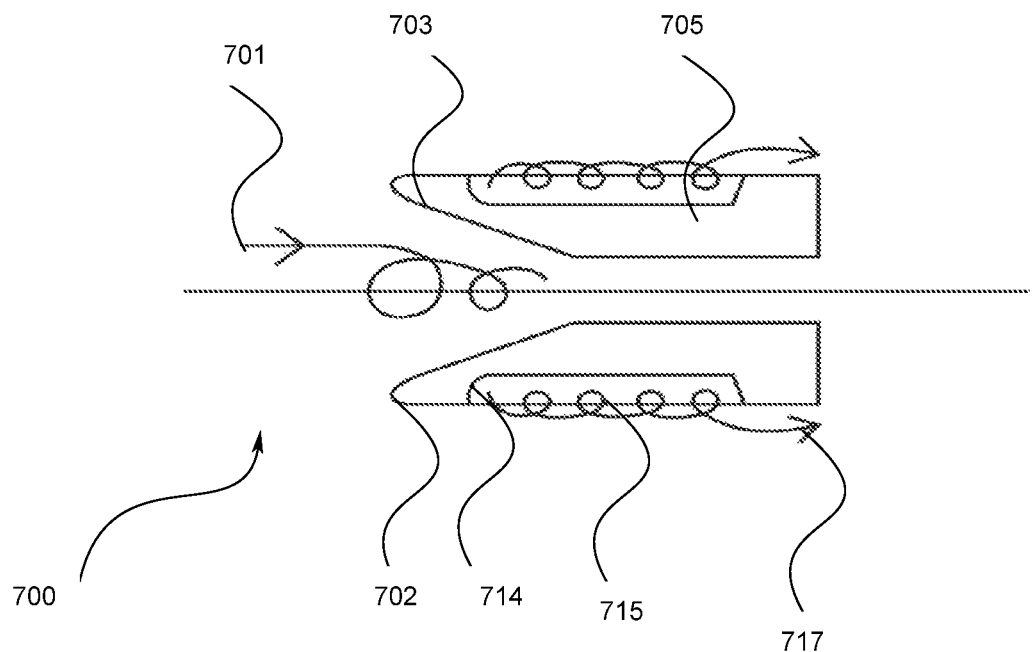
FIGS. 7A and 7B illustrates a hypersonic airflow system for a nose cone with both annular and peripheral spline cavities.
Figure 7B:
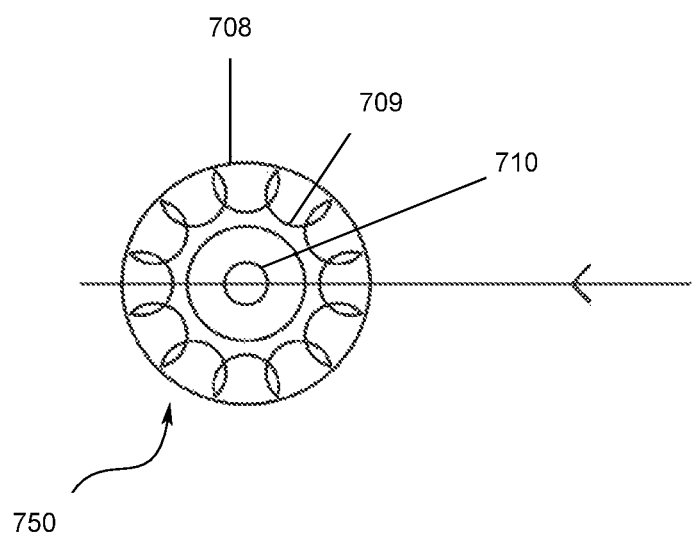

Referring to FIG. 7B, which illustrates a cross-sectional view 750 viewed across an axis V1 of FIG. 7A, illustrates an outer diameter 708 of the nosecone 705, a splined structure 709 of peripheral wall of nosecone 705 and a shaft diameter 710.

Figure 8A:
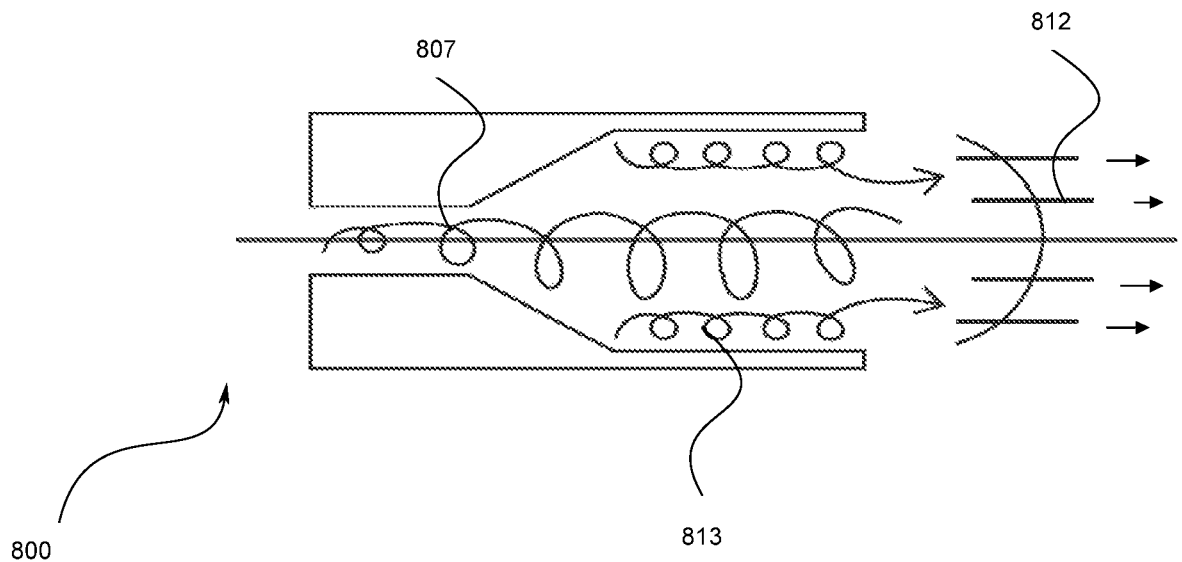
FIGS. 8A and 8B illustrates an isolated splined nozzle in conjunction with splined annular exit.

In an embodiment, FIG. 8 illustrates a system 800, which depicts an elemental splined centripetal thrust augmentation nozzle 806 isentropic switch whereby the funneled vortex flux 807 through a shaft 805 is transformed into a numerocity of contrarotating micro spline vortices 813 that generates the isentropical transformed propulsive supersonic front 812.

Figure 8B:
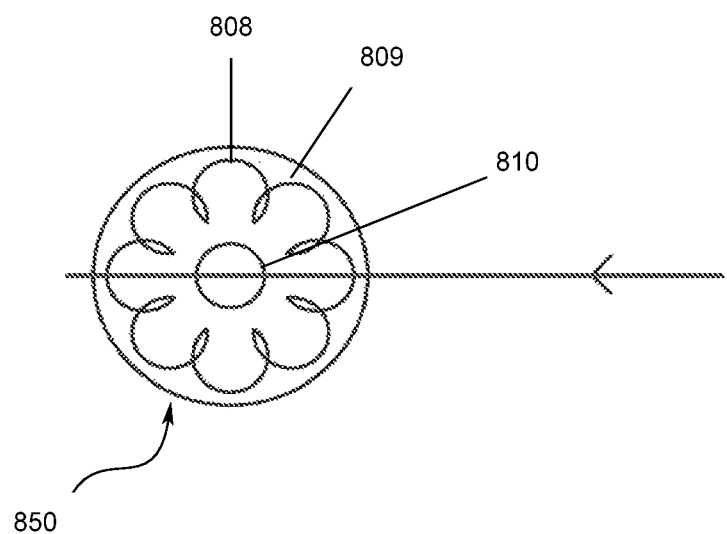

Referring to FIG. 8B, which illustrates a cross-sectional view 850, illustrates an outer diameter 808 of the expansion nozzle 806, a splined structure 809 of inner wall of expansion nozzle 806 and a shaft diameter 810.

Figure 9A:
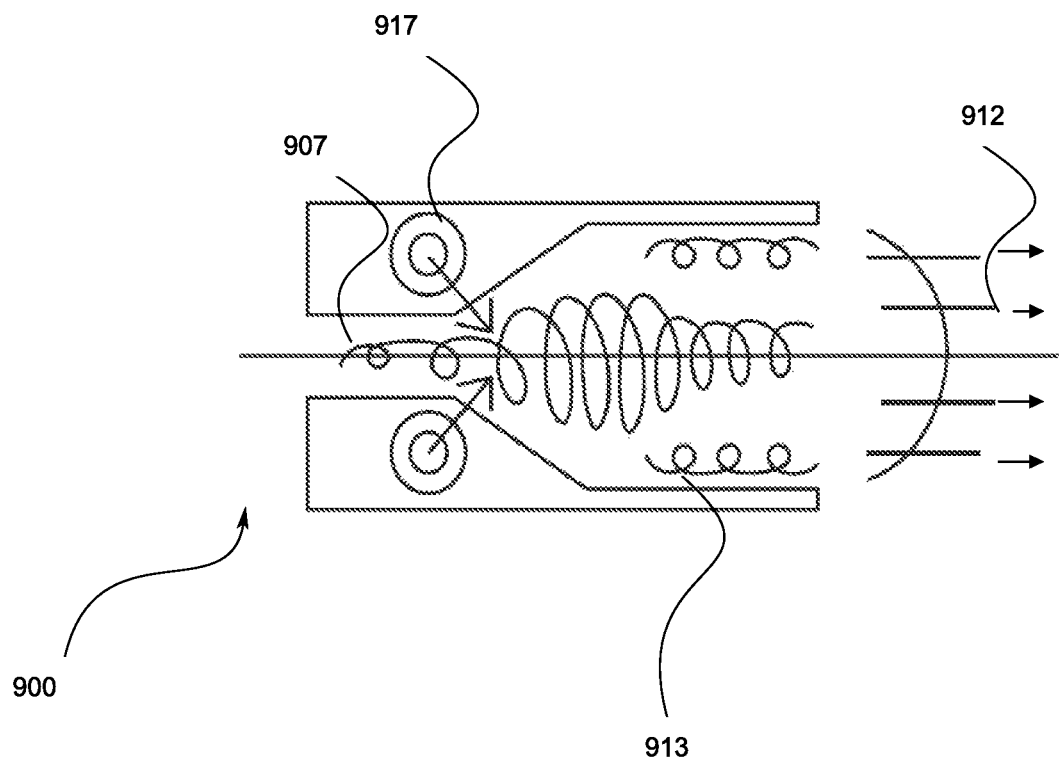
FIGS. 9A and 9B illustrates a hypersonic airflow system for a splined nozzle driven by an array of constellation micro propellant injectors.

In an embodiment, FIG. 9 illustrates a system 900, which depicts an enumerated splined centripetal thrust augmentation nozzle 906 isentropic switch whereby the funneled vortex flux 907 through shaft 905 is transformed into a numerocity of contrarotating micro spline vortices 913 driven by an array of hypersonic constellation micro propellant injectors 917 that generates the isentropical transformed propulsive supersonic streamline 912.

Figure 9B:
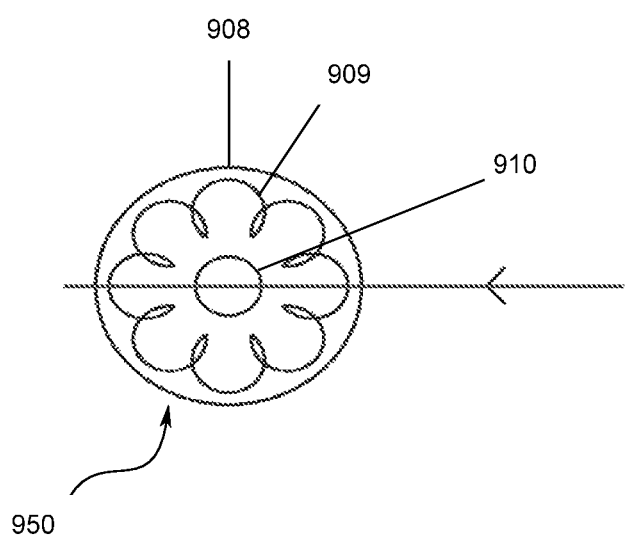

Referring to FIG. 9B, which illustrates a cross-sectional view 950, illustrates an outer diameter 908 of the expansion nozzle 906, a splined structure 909 of inner wall of expansion nozzle 906 and a shaft diameter 910.

Figure 10:
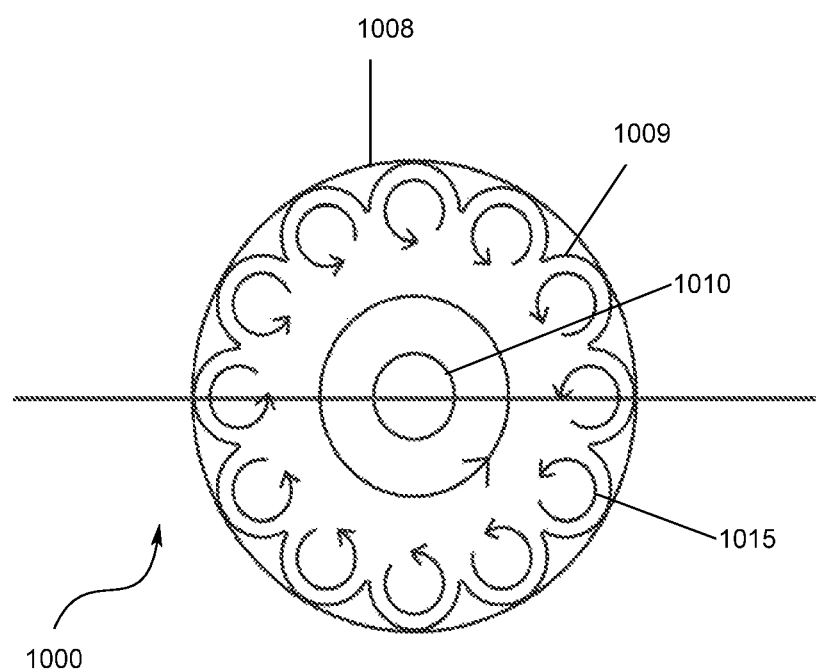
FIG. 10 illustrates the micro splines in a Z/Y-plane gear transformation.

In an embodiment, FIG. 10 depicts a planetary splines gear transmission system 1000, wherein 1008/1009/1010 represent the outer/inner shell and the central shaft respectively and 1015 representing the contrarotating spline vortex flux. The sum of the splines induced micro/inversed vortices YY=power of the incipient/shafted vortex.

In a sudden expansion in a duct or nozzle system, the splines constitute a sudden/grooved expansion in a supersonic expansion nozzle whereby (1) micro contra rotating vortex streams are spawned via sudden expansion which minors the master vortex flux succinctly (2) the sum total of the micro/spline vortices equals the incipient master/mother vortex flux (3) the micro/spline flux negates the incipient master/mother vortex, the incipient master/mother vortex flux is spatially trans formed/reincarnated into supersonic isentropic streamlines.

The supersonic splines isentropic switch functions as (1) supercharged Joule-Thomson refrigeration engine in the cryogenic zone and (2) supercharged thrust augmentation expansion nozzle with a centripetal supersonic ram detonation thrust augmentation propulsive nozzle.

In order to model the dynamics of the splines hypersonic/stochastic and supersonic/isentropic transformation computationally vector matrix power factor analogy in conformance with electrical power transmission is being applied whereby in a purist isentropic potential field the stagnation and velocity vectors are in perfectly alignment/symmetry. Given that in a perfect electrical/fluidic potential field the current/voltage and stagnation pressure/velocity are in perfect alignment the power factor $[COS(\emptyset)]$ must be unity (i.e. $\cos(\emptyset)=1.0$) both ways. However, in event of current/voltage lead/lag and velocity/stagnation pressure divergence the power factor will be smaller than unity (i.e. $\cos(\emptyset)<1$). In order to enumerate actual (real time) splines power factor divergence actual. Cryogenic regression [−180C/−170C/−150C/−140C/−120C/23C] (M5 stagnation pressure) data sets has been employed that rendered $\cos(\emptyset)=0.41/0.35/0.32/0.31/0.30/0.27$ [66/70/71/72/73/74deg] as to purist (isentropic) and $\cos(\emptyset)'=0.36/0.33/0.30/0.30/0.29/0.26$ [69/71/72/73/73/75deg] as to purist stochastic/random transformation respectively.

With the power factor postulation in place backed up with and actual measured (M5) hypersonic/cryogenic stagnation transformation "regression" data, the splines isentropic transformation may be modeled by an isentropical expansion as follows:

$M=((Pr)^{0.286}-1)\times 5)^{0.5}$ generally and $Me=((Pri\times \cos(\emptyset)')^{0.286}-1)\times 5)^{0.5}$ specifically and $(2) T2 = T1\times(1+0.2Me^2)^{-1}$ consequently.

Applying the data $\cos(\emptyset)'=\cos(\emptyset)\times 0.887$, $Me=[((150\times 0.41\times 0.887)^{0.286}-1)\times 5]^{0.5}=[(3.14-1)\times 5]^{0.5}=[10.7]^{0.5}=3.3$. Conversely given $Me=3.3$, $T2=93\times(1+0.2\times 3.3^2)^{-1}=93\times(2.18)^{-1}=93/2.18=42.7K=-230.5C$. Noteworthy is that although the exit Mach number $Me=3.3$ is 30% lower than the incipient isentropic front @M5, the Mach number impairment is minimal taking in account that (1) (regenerative/isothermal compression shockwave piercing utility and (2) turning the splines into a powerful refrigeration engine. See tabulation as to the VT3 data spread −180/−170/−150/−140−120/23C in totality.

| 1. dU = δQ + δW = δQ [with δW = 0][ISOTHERMAL] | | | | | |
| --- | --- | --- | --- | --- | --- |
| Me/C | −180 | −170 | −150 | −140 | −120 | 23 |
| Me/K | 93 | 103 | 123 | 133 | 153 | 296 |
| cosφ | 0.41 | 0.35 | 0.32 | 0.31 | 0.30 | 0.27 |
| φ | 66 | 70 | 71 | 72 | 72.5 | 74 |
| R' | 8.87 | 9.53 | 9.54 | 9.57 | 9.59 | 9.66 |
| Pr | 150 | 127 | 117 | 113 | 110 | 100 |
| Me | 3.3 | 3.1 | 3.0 | 2.9 | 2.9 | 2.8 |
| Te/K | 29.7 | 35.4 | 44.3 | 48.7 | 57.0 | 116.1 |
| Te/C | −243.3 | −237.6 | −228.7 | −224.3 | −216.0 | −156.9 |

| 2. dU = δQ + δW = δW [with δQ = 0] [ADIABATIC] | | | | | |
|---|---|---|---|---|---|
| Ti/C | −180 | −170 | −150 | −140 | −120 | 23 |
| Ti/F | −292 | −274 | −238 | −220 | −184 | 73 |
| Ti/R | 168 | 186 | 222 | 240 | 276 | 533 |
| Qpr | 20000 | 20000 | 20000 | 20000 | 20000 | 20000 |
| Apr | 12 | 12 | 12 | 12 | 12 | 12 |
| Qpr' | 1667 | 1667 | 1667 | 1667 | 1667 | 1667 |
| ΔTpr' | 6667 | 6667 | 6667 | 6667 | 6667 | 6667 |
| Tmax/F | 5000 | 5000 | 5000 | 5000 | 5000 | 5000 |
| Qstoich | 0.75 | 0.75 | 0.75 | 0.75 | 0.75 | 0.75 |
| Rstoich | 30 | 27 | 23 | 21 | 18 | 9 |
| Me | 12.0 | 11.4 | 10.4 | 10.0 | 9.3 | 6.5 |
| Isec | 3,769 | 3,581 | 3,195 | 3,031 | 2,742 | 1,593 |
| | 12.0 | 11.4 | 10.4 | 10.0 | 9.3 | 6.5 |
| | 29.7 | 35.4 | 44.3 | 48.7 | 57.0 | 116.1 |

As for work performed the nominal splines isentropically expanded Mach number Me=3.3/3.1/3.0/2.9/2.9/2.8 respectively. However, in event of supersonic ram combustion the exit Mach number is boosted to Me'=12/11.4/10.4/10/9.3/6.5 respectively in accordance with the enumerated spreadsheet.

In a preferred embodiment, a thermally reactive nosecone mounted on a projectile for achieving hypersonic transport is described. Wherein an incipient shockwave is transformed into an isentropic flux via a stochastic switch. The stochastic switch is a singularity switch whereby a linear continuum is transformed into a gyrating stagnation flux and the singularity is a consequence of isothermal compression and hypersonic liquefaction of the incipient shockwave onto the thermally reactive nosecone. The isothermal compression and hypersonic liquefaction is achieved via regenerative cooling of the thermally reactive nosecone.

In a preferred embodiment, the singularity/isothermal compression transforms the insipient hypersonic streamlines into a harmonic stochastic vortex flux. wherein isothermal compression of the thermally reactive nosecone is achieved via regenerative cooling of the thermally reactive nosecone via Joule-Thomson throttling and complex cryogenic Carnot refrigeration. Wherein Joule-Thomson throttling and complex Carnot refrigeration is triggered via sudden expansion and/or a porous plug integrated into the discharge end of the thermally reactive nosecone. wherein Joule-Thomson throttling and complex Carnot refrigeration is triggered via grooved isentropic splines inside the nozzle of the thermally reactive nosecone. with grooved isentropic splines that transform the vortex flux into isentropic streamlines.

In a preferred embodiment, the isentropic switch is integrated onto a discharge and/or peripheral of the thermally reactive nosecone is described. wherein an extrinsic cryogenic resource is applied to precool the thermally reactive nosecone in addition to the stochastic switched hypersonic stagnation front to supercharge the switching power of the shockwave piercing stochastic switch. Wherein the extrinsic cryogenic resource to supercharge the switching power of the shockwave piercing stochastic switch is liquid nitrogen and/or a liquid cryogenic propellant. The thermally reactive nosecone is optimized for throttling and triggering complex Carnot refrigeration liquefaction of atmospheric oxygen to drive a rocket propulsion engine of a hypersonic transport. wherein an isentropic hypersonic expansion nozzle is applied to drive the thermally reactive nosecone as a cryogenic refrigeration apparatus. wherein the isentropic hypersonic expansion nozzle of the thermally reactive nosecone is optimized to distill liquid helium. wherein hydrogen in the range of 1-5% of helium is introduced into the isentropic expansion nozzle to boost the liquefaction capacity of liquid helium. wherein liquid helium is directly distilled out of compressed helium. A freestanding thermally reactive nosecone comprising of isentropic hypersonic expansion nozzle wherein liquid helium is directly distilled out of compressed helium.

In a preferred embodiment, a freestanding thermally reactive nosecone comprising of isentropic hypersonic expansion nozzle with isentropic splines is described. Wherein liquid helium is directly distilled out of compressed helium. which is scaled as a personal helium distillation plant driven by tanked and compressed Helium and Liquid Nitrogen. which is scaled as an enterprise Liquid Helium production facility with Liquid Nitrogen and with the addition of Hydrogen. Which is scaled as an enterprise Liquid Helium production facility without Liquid Nitrogen and without the addition of Hydrogen. which is scaled as an enterprise Liquid Helium production facility with Liquid Nitrogen and with the addition of Hydrogen. which is scaled as an enterprise Liquid Helium production facility without Liquid Nitrogen without the addition of Hydrogen. Wherein the thermally reactive nosecone is coupled within the confinements of rocket missile and/or aerospace plane with a centripetal thrust augmentation nozzle. the centripetal thrust augmentation nozzle is equipped with grooved isentropic splines that transform the vortex flux into isentropic streamlines. the grooved isentropic splines centripetal thrust augmentation nozzle is equipped with enumerated supersonic ram detonation propulsive means in addition to grooved isentropic splines in isolation.

In a preferred embodiment, a double/isentropic switch adaptation of the stochastic switch comprising of a supersonic isentropic splines switch, a planetary splines switches, an incipient stochastic vortex, a contrarotating splines vortices, a transformed/switched isentropic jet is described.

The invention claimed is:
1. An apparatus for mitigating a shock front of a nosecone that operates at hypersonic speed comprising:
    a nosecone, said nosecone having a nosecone intake proximately disposed to accept a flow of air; the nosecone intake having a funnel shaped surface, the large end of the funnel shape surface proximately dispose to the intake;
    a shaft, the air inlet end of the shaft connected to the nosecone intake for directing the flow of air over the funnel shaped surface, and an outlet end of the shaft that transporting the flow of air;
    an outlet funnel, said outlet having a second funnel shaped surface, the small end of the second funnel shaped surface connected to the outlet end of the shaft;
    an expansion nozzle, said expansion nozzle having a inlet end and an outlet end, the inlet end connected to the large end of the second funnel shaped surface;
    a means for cryogenically cooling the second funnel shaped surface;
    such that the overall drag on the nosecone is reduced.

* * * * *